United States Patent
Hoffman

(10) Patent No.: US 7,770,686 B2
(45) Date of Patent: Aug. 10, 2010

(54) DRIVETRAIN FOR A MOTOR VEHICLE

(75) Inventor: Werner Hoffman, Siegburg (DE)

(73) Assignee: GETRAG Driveline Systems GmbH, Cologne (DE)

( * ) Notice: Subject to any disclaimer, the term of this patent is extended or adjusted under 35 U.S.C. 154(b) by 542 days.

(21) Appl. No.: 11/712,098

(22) Filed: Feb. 28, 2007

(65) Prior Publication Data

US 2007/0235245 A1    Oct. 11, 2007

(30) Foreign Application Priority Data

Mar. 8, 2006    (DE) .................. 10 2006 011 912

(51) Int. Cl.
*B60K 17/16*    (2006.01)

(52) U.S. Cl. .................. 180/375; 180/376; 180/379; 180/380

(58) Field of Classification Search .................. 180/375, 180/376, 379, 380
See application file for complete search history.

(56) References Cited

U.S. PATENT DOCUMENTS

| | | | | |
|---|---|---|---|---|
| 2,456,616 A | * | 12/1948 | Buckendale | 180/349 |
| 2,625,231 A | * | 1/1953 | Martin | 180/266 |
| 2,766,637 A | * | 10/1956 | Bock | 74/368 |
| 4,289,213 A | * | 9/1981 | Seaman | 180/233 |
| 4,771,842 A | * | 9/1988 | Mishio et al. | 180/376 |
| 5,379,857 A | * | 1/1995 | Niederhofer | 180/248 |
| 5,758,738 A | * | 6/1998 | Carroll et al. | 180/292 |
| 6,394,215 B1 | * | 5/2002 | Masuda | 180/232 |
| 2004/0040777 A1 | * | 3/2004 | Campbell | 180/379 |

* cited by examiner

*Primary Examiner*—Lesley Morris
*Assistant Examiner*—Marlon A Arce
(74) *Attorney, Agent, or Firm*—Knobbe, Martens, Olson & Bear, LLP

(57) ABSTRACT

The invention relates to a drivetrain for a motor vehicle which has a first and a second axle and a chassis. The drivetrain comprises a drive unit which is mounted to the chassis in the region of the first axle and has an output shaft. Further, the drivetrain comprises a propeller shaft arrangement which is connected to the output shaft and to an input member of a differential which is mounted to the chassis in the region of the second axle. The propeller shaft arrangement comprises at least a first propeller shaft section and a second propeller shaft section which are connected to one another by means of an articulated joint. The propeller shaft arrangement is mounted to the chassis in the region of the articulated joint. The second propeller shaft section of the propeller shaft arrangement is connected rigidly to the input member of the differential. The second propeller shaft section is mounted in the region of the articulated joint and is designed to resist bending moments around the second axle.

5 Claims, 2 Drawing Sheets

DRIVETRAIN FOR A MOTOR VEHICLE

BACKGROUND OF THE INVENTION

The present invention relates to a drivetrain for a motor vehicle which has a first and a second axle and a chassis, comprising a drive unit which is mounted to the chassis in the region of the first axle and has an output shaft, and comprising a propeller shaft arrangement which is connected to the output shaft and to an input member of a differential which is mounted to the chassis in the region of the second axle, the propeller shaft arrangement comprising at least a first propeller shaft section and a second propeller shaft section which are connected to one another by means of an articulated joint, and the propeller shaft arrangement being mounted to the chassis in the region of the articulated joint.

A drivetrain of this type is generally known.

For example, in the case of the drivetrain of the all-wheel-drive variant of the Porsche 996 it is known to fix a tubular element for resisting bending moments (called a torque tube) to the housing of the differential.

The second propeller shaft section is mounted in bearings inside this tube. The tube itself is mounted to the chassis in the region of the articulated joint.

By means of the tube a coupling point for attaching the differential housing to the chassis can be arranged relatively far from the second axle in order to be able to resist bending moments even if a comparatively soft suspension is selected.

In such all-wheel-drive vehicles, in addition to which there is also a normal two-wheel-drive variant, it is often difficult, with regard to the accommodation of the "driven" differential, to isolate the vehicle sufficiently from vibration. This is the reason why such driven differentials are often suspended relatively softly.

The use of a tube to resist bending moments has the disadvantage, however, that the propeller shaft section running therein must be manufactured very accurately in order to avoid the bearings running free of play (compulsory running). Furthermore, the tube itself, even if made from a light alloy, constitutes a not inconsiderable additional mass. Additional financial cost is also incurred.

SUMMARY OF THE INVENTION

Against the above background, it is the object of the present invention to specify an improved drivetrain.

This object is achieved in the drivetrain mentioned in the introduction wherein the second propeller shaft section of the propeller shaft arrangement is connected rigidly to the input member of the differential, and wherein the second propeller shaft section is mounted in the region of the articulated joint and is designed to resist bending moments around the second axle.

The present invention is therefore based on the fact that, unlike the solutions used hitherto, the second propeller shaft section is not connected to the input member of the differential by means of an articulated joint but is connected rigidly thereto. Consequently, the second propeller shaft section is itself suited to resisting bending moments about the second axle.

It is self-evident that the second propeller shaft section must be suitably dimensioned for this purpose. Even if, as a result, the second propeller shaft section is possibly more expensive to produce than corresponding propeller shaft sections of the prior art, a considerable saving in cost and weight can be achieved by dispensing with the outer tube.

Although, in view of the problems mentioned in the introduction, the invention is of particular importance for all-wheel-drive vehicles, it is not limited thereto.

Furthermore, in general it is also possible to use a rigid connection of a propeller shaft section to a further member even in the region of a power take-off unit (PTU). In this case the first propeller shaft section would, for example, be connected rigidly with an output member of such a power take-off unit. In this case the rigid connection is used, in particular, to save a complete articulated joint. In this application bending moments generally do not need to be resisted.

The above-mentioned object is therefore achieved completely.

It is especially preferred if the input member of the differential is a pinion shaft.

In this case a rigid connection can be designed in a simple manner.

Furthermore, it is especially advantageous in this case if the pinion shaft is aligned axially with the propeller shaft arrangement.

This, too, leads to simple implementation of the drivetrain according to the invention.

It is also advantageous if the pinion shaft has a gear wheel which is in engagement with a cage of the differential.

For example, a crown-wheel may be provided on the differential cage in a manner known per se.

According to a further preferred embodiment the pinion shaft includes a section which projects with respect to a housing of the differential, to which projecting section the second propeller shaft section is fixed.

This makes it possible to pre-install the differential and to execute the connection to the second propeller shaft section during final assembly.

In this case it is especially advantageous if a bush is fixed to the projecting section of the pinion shaft, which bush has a flange section to which the second propeller shaft section is fixed.

The bush makes it possible, firstly, to establish a rigid connection to the pinion shaft and, secondly, to connect the second propeller shaft section to the pinion shaft in a constructionally advantageous manner.

In general it is further preferred if the second propeller shaft section is in the form of a hollow shaft.

In this way an overall weight saving can be achieved.

According to a further preferred embodiment the second propeller shaft section has a plurality of openings for achieving an acoustic short-circuit.

Through this measure droning noises, for example, or the like, which can generally occur with hollow shafts, in particular with comparatively large-volume hollow shafts, can be avoided.

In general it is also preferred if both the first axle and the second axle of the motor vehicle are driven, that is, if the vehicle concerned is in all-wheel-drive vehicle. In that case the concept of the present invention is applied especially advantageously. The second propeller shaft section serves not only to transmit torques to the input member (the pinion shaft), but also to resist bending moments resulting from reaction forces of the drive of the differential.

It is self-evident that the aforementioned features, and the features to be explained hereinafter, can be used not only in the particular combination specified but also in other combinations or in isolation, without departing from the scope of the present invention.

BRIEF DESCRIPTION OF THE DRAWINGS

Embodiments of the invention are represented in the drawing and are explained in more detail in the following description. In the drawings.

DETAILED DESCRIPTION OF THE INVENTION

Figure 1:
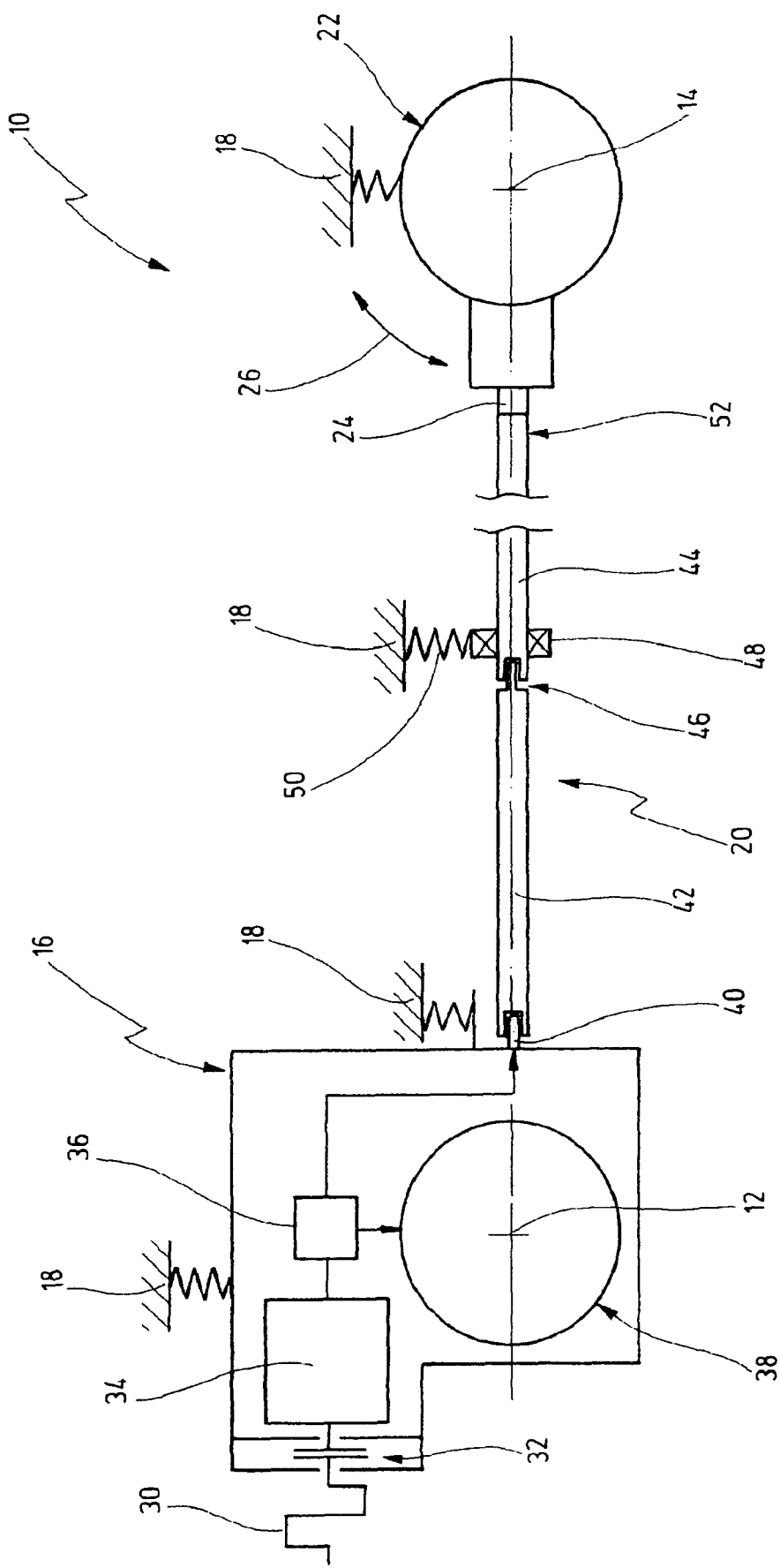
FIG. 1 is a schematic representation of a first embodiment of a drivetrain according to the invention.

In FIG. 1 a drivetrain according to the invention for a motor vehicle is denoted generally by reference 10.

The drivetrain 10 is installed in a motor vehicle which has a first axle 12 and a second axle 14. The first axle 12 may be, for example, the rear axle (for example, when used in a rear-engined vehicle). Alternatively, however, the first axle 12 may be the front axle.

The motor vehicle may be driven by means of a drive unit 16 which is arranged in the region of the first axle 12.

The drive unit 16 is mounted to the motor vehicle, more precisely to a chassis 18 of the motor vehicle, which is represented schematically in FIG. 1.

The drive unit 16 is used to drive both the first axle 12 and the second axle 14. To drive the second axle 14 there is provided a propeller shaft arrangement 20 which connects an output member of the drive unit 16 to an input member 24 of a differential 22. The differential 22 is arranged in the region of the second axle 14.

During operation of such a vehicle bending moments 26, which result from the fact that the second axle 14 is driven, occur around the second axle 14. These bending moments 26 occur, in particular, during traction and overrun conditions and must be resisted by the chassis 18 of the vehicle.

The differential 22 is mounted to the chassis 18 in a relatively resilient manner in order to achieve good isolation of the chassis 18 from vibration.

The drive unit 16 comprises an internal combustion engine 30, the output member of which is connected to an input member of a starting and engine-disconnecting clutch 32. An output member of the starting and engine-disconnecting clutch 32 is connected to an input member of a main transmission 34, for example, a multi-speed transmission, an infinitely variable transmission (CVT or toroidal transmission), an automatic transmission with torque converter or the like. The starting and engine-disconnecting clutch 32 is unnecessary with some transmissions or is replaced by a torque converter. In the case of dual-clutch transmissions two such clutches are present.

In all cases the main transmission 34 makes available a plurality of transmission ratios and transmits torque to a power divider 36. The power divider 36 distributes the torque, firstly, to the first axle 12 or, more precisely, to a further differential 38 arranged in the region of the first axle. Secondly, the power divider 36 transmits torque to an output shaft 40 of the drive unit 16.

The output shaft 40 is connected to the propeller shaft arrangement 20.

Instead of a power divider 36, it is also possible to connect the second axle 14, as required, by means of a clutch (the so-called hang-on solution, for example, in the form of a Haldex clutch, a viscous coupling or the like).

The propeller shaft arrangement 20 comprises a first propeller shaft section 42 and a second propeller shaft section 44 connected axially thereto. The first propeller shaft section 42 and the second propeller shaft section 44 are connected to one another by means of an articulated joint 46, generally what is known as a constant-velocity joint.

The first propeller shaft section 42 is connected to the output shaft 40 of the drive unit 16. The second propeller shaft section 44 is connected to the input member 24 of the differential 22.

The second propeller shaft section 44 is mounted to the chassis 18 in the region of the articulated joint 46 by means of a bearing 48 and an elastic member 50. In addition, the second propeller shaft section 44 is connected to the input member 24 of the differential 22 by means of a rigid connection 52.

As a result of the rigid connection 52 and the mounting in the region of the articulated joint 46, the second propeller shaft section 44 can not only transmit torques to the differential 22 but can also resist bending moments 26 about the second axle 14.

A separate tube (torque tube) connected to a housing of the differential 22, as used in the prior art, is not necessary.

As a whole, therefore, the drivetrain can be produced economically and with low weight.

The drivetrain 10' shown in FIG. 2 corresponds generally to the drivetrain 10 of FIG. 1 with regard to construction and operation, so that only differences will be discussed in what follows.

It can be seen that the differential 22 has a housing 60 in which a differential cage 62 is mounted rotatably in conventional fashion.

In addition, a pinion shaft 64 is mounted rotatably in the housing 60. The pinion shaft 64 is aligned axially with the second propeller shaft section 44 and has a pinion 66 which is in rotational engagement with the differential cage 62 (for example, the differential cage 62 has a crown-wheel).

Furthermore, the pinion shaft 64 has a section 68 which projects axially with respect to the housing 60 of the differential 22. The second propeller shaft section 44 is connected to the projecting section 68.

The housing 60 has a portion in which the pinion shaft 64 is mounted by means of two pinion shaft bearings 70, 72. The pinion shaft bearings 70, 72 are in the form of tapered roller bearings and form an "O" arrangement. Altogether, the pinion shaft 64 which forms the input member 24 of the differential 22 is mounted very rigidly in the housing 60.

A bush 74 is fixed non-rotatably to the axially projecting section 68, for example, by means of splines. The bush 74 includes a flange section 76 which is connected to a corresponding flange section 78 of the second propeller shaft section 44, for example, by means of a plurality of screws, as illustrated.

The other end of the second propeller shaft section 44 has a spigot section 80 which is mounted to the chassis by means of the bearing 48.

Figure 2:
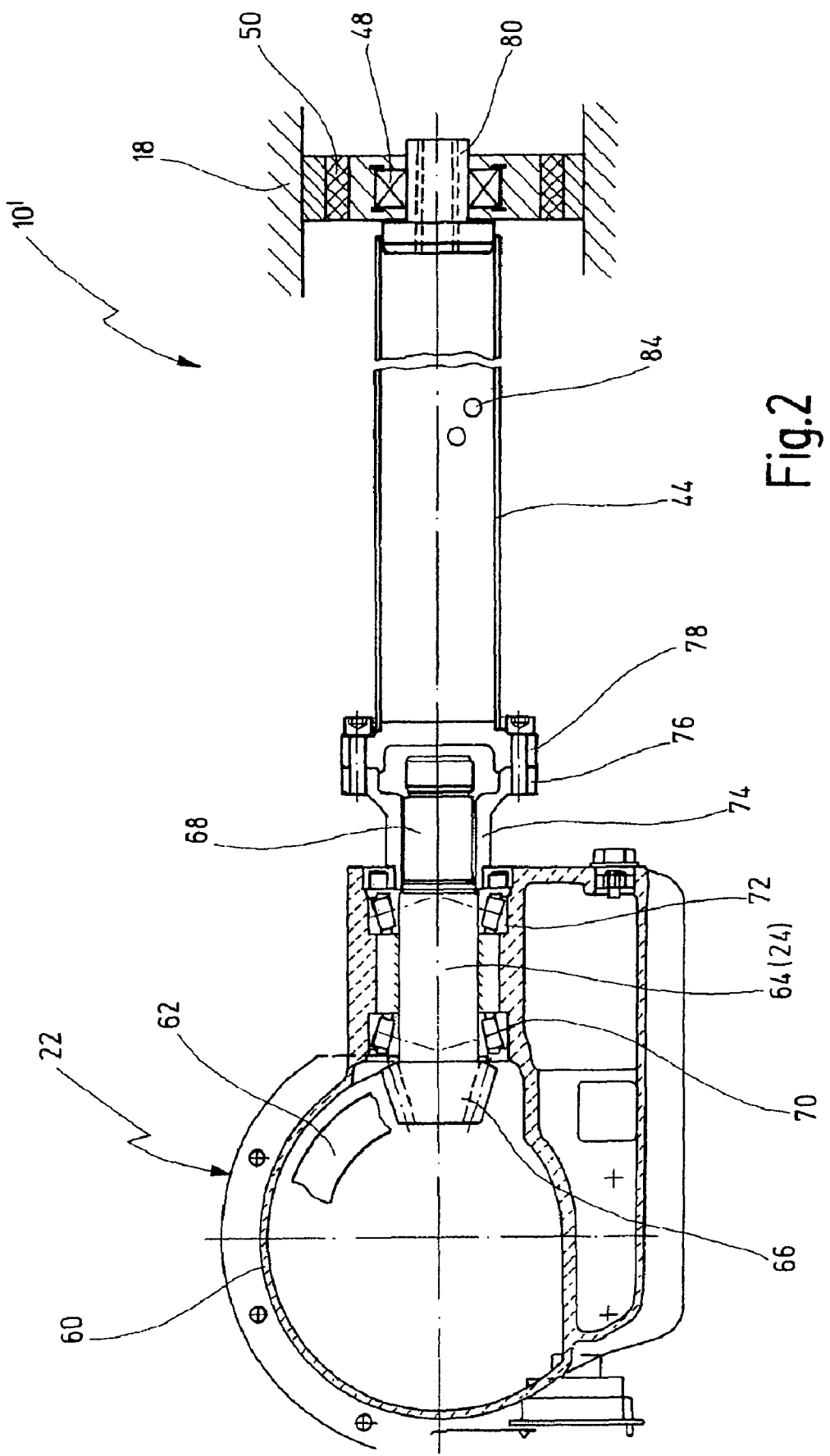
FIG. 2 is a schematic sectional view of a further embodiment of the drivetrain according to the invention.

It is further shown in FIG. 2 that the second propeller shaft section 44 is in the form of a hollow shaft and is optionally provided with a plurality of openings 84. The openings 84 serve to establish an acoustic short-circuit in order to improve the noise level, if applicable.

What is claimed is:

1. A drivetrain for a motor vehicle which has a first and a second axle and a chassis, the drivetrain comprising a drive unit which is mountable to the chassis in the region of the first axle and has an output shaft, and comprising a propeller shaft arrangement which is connected to the output shaft and to an input member of a differential which is mountable to the chassis in the region of the second axle, the propeller shaft arrangement comprising at least a first propeller shaft section and a second propeller shaft section which are connected to one another by means of an articulated joint, and the propeller shaft arrangement being mounted to the chassis in the region of the articulated joint, wherein the second propeller shaft section of the propeller shaft arrangement is connected rigidly to the input member of the differential, is mounted in the region of the articulated joint and is designed to resist bending moments around the second axle, wherein the input member of the differential is a pinion shaft that includes a section which projects with respect to a housing of the differential, to which projecting section the second propeller shaft section is fixed, wherein a bush is fixed to the projecting section of the pinion shaft, which bush has a flange section to which the second propeller shaft section is fixed.

2. The drivetrain according to claim 1, wherein the pinion shaft is aligned axially with the propeller shaft arrangement.

3. The drivetrain according to claim 1, wherein the pinion shaft has a gear wheel which is in engagement with a cage of the differential.

4. The drivetrain according to claim 1, wherein the second propeller shaft section is in the form of a hollow shaft.

5. The drivetrain according to claim 1, wherein both the first axle and the second axle of the motor vehicle are driven.

* * * * *